3,463,244
PLANT PULLER
Joseph T. McFadden, 607 Medical Tower, Medical
Center, Norfolk, Va. 23507
Filed Jan. 18, 1967, Ser. No. 610,052
Int. Cl. A01b 1/16; A01d 7/10, 53/12
U.S. Cl. 172—378                        5 Claims

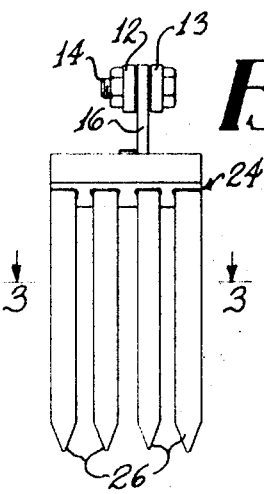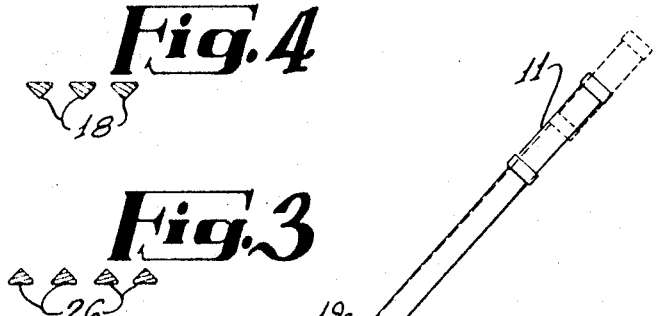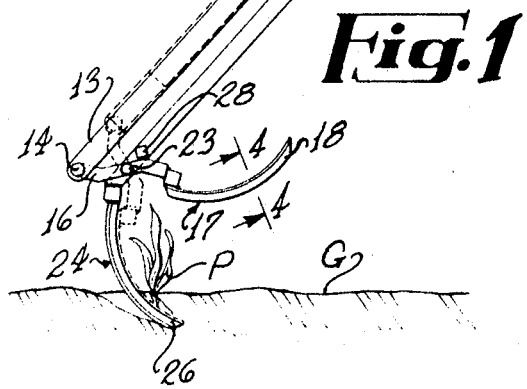
INVENTOR.
Joseph T. McFadden
BY
Jennings, Carter & Thompson
Attorneys United States Patent Office 3,463,244
Patented Aug. 26, 1969

ABSTRACT OF THE DISCLOSURE

A plant puller embodying an elongated handle having a depending link pivotally connected to its lower end with the link carrying a first jaw set. A sleeve slides on the handle and is connected to an extension bar carrying a second jaw set. The bar is pivotally connected to the link whereby the second jaw set may be driven hoe-like into the ground and the jaw sets are moved toward each other by pulling the elongated handle.

Background of the invention

Heretofore in the art to which my invention relates, difficulties have been encountered in pulling plants, such as weeds, vines and the like with a digging fork or hoe-like tool due to the fact that no effective means has been provided for automatically gripping the plant as the handle of the tool is pulled in a conventional manner. That is, tools heretofore employed to pull such plants have embodied a gripping element which is actuated independently of the handle whereby the gripping element must be moved into clamping engagement with the plant prior to pulling the handle of the tool to extract the plant. It is very desirable to have a tool which may be employed as a hoe or digging fork and as a plant puller for weeds, vines and the like since it is often difficult to reach such plants due to their location. Also, many weeds and vines are located beneath shrubs which have thorns or briars thereon whereby it is difficult to pull the weeds and vines without coming in contact with the thorns and briars.

Brief summary of invention

In accordance with my invention, I provide a plant puller which includes an elongated handle having a depending link mounted for pivotal movement at its lower end. A first jaw set is carried by the lower end of the depending link. Mounted for sliding movement on the elongated handle is a sleeve which is connected to an extension bar which extends downwardly alongside the handle across the depending link and is pivotally connected to the link where the two cross each other. A second jaw set is carried by the lower end of the extension bar in position to cooperate with the first jaw set upon pulling the upper end of the handle in a conventional manner whereby the jaw sets move into clamping relation with the plant without having to actuate the extension bar independently of the handle.

Apparatus embodying features of my invention is illustrated in the accompanying drawing, forming a part of this application, in which:

FIG. 1 is a side elevational view of the apparatus;

FIG. 2 is a rear elevational view, parts being omitted for the sake of clarity;

FIG. 3 is a sectional view taken generally along the line 3—3 of FIG. 2;

FIG. 4 is a sectional view taken generally along the line 4—4 of FIG. 1;

FIG. 5 is an enlarged view taken along the line 5—5 of FIG. 1; and,

FIG. 6 is a transverse, sectional view taken through both jaw sets while the sets are in contact with each other.

Referring now to the drawing for a better understanding of my invention, I show an elongated handle 10 having a resilient gripping element 11 at the upper end thereof. The lower end of handle 10 is provided with a yoke having forwardly extending end members 12 and 13, as shown in FIG. 2.

Extending upwardly between the end members 12 and 13 and pivotally connected thereto by a transverse bolt 14 is a depending link 16. Secured rigidly to the lower end of the depending link 16 is a first jaw set indicated generally at 17 which is provided with spaced apart tines 18, as shown in FIG. 4.

Mounted for sliding movement on the handle 10 in spaced relation to the upper end thereof is a sleeve member 19 which is connected by a pivot pin 21 to the upper end of a rigid extension bar 22. As shown in FIG. 1, the extension bar 22 extends downwardly alongside the handle across the depending link 16 and is pivotally connected to the link 16 by a bolt 23. Secured rigidly to the lower end of the extension bar 22 is a second jaw set 24 having depending tine elements 26, as shown in FIG. 3.

The sleeve member 19 serves as a hand grip for the right hand of a right hand operator while the left hand of the operator holds the gripping element 11. Accordingly, by moving the sleeve member 19, the extension bar 22 may be moved upwardly relative to the handle 10 to thus move the jaw sets 17 and 24 to fully open position, as shown in solid lines in FIG. 1. The extension bar 22 is also provided with a hand grip 27 adjacent the upper end thereof so that the operator may grasp the tool up shorter as when stooping to cultivate around vegetables, flowers and the like. The tool is thus adapted to cultivate the ground and remove weeds at the same time. To limit the distance that the jaw sets move toward open position, I provide a stop member 28 on the extension bar 22 in position to engage the link 16, as shown in FIG. 1. While I have shown the stop member 28 as being carried by the extension bar 22, it will be apparent that the stop member could be carried by the link 16 in position to engage bar 22 to limit outward movement of the jaw sets relative to each other.

As shown in FIGS. 2, 3, 4 and 6, the tine elements 18 and 26 are spaced from each other so that when brought together, as shown in FIG. 6, the tines of each set substantially close the spaces between the tines of the other set. Accordingly, while in closed position, as shown in FIG. 6, the jaw sets form a substantially continuous surface, thus preventing escape of small weeds, vines or the like. As shown in FIG. 1, the tines 18 and 26 of the jaw sets 17 and 24 are concavely curved as viewed from the front or the side thereof facing the upper end of the handle 10 whereby they are directed downwardly and inwardly of the ground indicated generally at G. The tines 26 are thus adapted to move downwardly and inwardly beneath the plant indicated generally at P.

From the foregoing description, the operation of my improved apparatus for pulling weeds, vines and the like will be readily understood. The sleeve 19 is moved upwardly, as described above, along the handle 10 to move the jaw sets 17 and 24 to fully open position, as shown in solid lines in FIG. 1. As the link 16 moves about its pivot bolt 23, it engages the stop 28 to thus limit movement of the jaw sets outwardly relative to each other. The jaw set 24 is driven hoe-like into the ground G rearwardly of the plant P by holding the sleeve 19 in one hand and the grip 11 in the other whereby the tines 26 move beneath the plant, as shown. While grasping the hand grip 11, the operator pulls the elongated handle 10 upwardly and forwardly whereupon the link 16 moves about its pivot bolt 23 to position the jaw set 17 in gripping relation with the jaw set 24, as shown in dotted lines in FIG. 1, to thus clamp the plant P therebetween. Continued movement of the handle 10 in an upward direction extracts the plant P from the ground. To release the plant, the sleeve 19 is again moved toward the upper end of handle 10 whereby the jaw sets 17 and 24 move to the solid line position shown in FIG. 1. After the plant has been pulled out of the ground, it can be lifted in the apparatus and dirt shaken therefrom. Also, the plant may be placed in a suitable receptacle or may be transferred to any desired location while clamped between the jaw sets 17 and 24. The apparatus is also adapted to be inserted under brushes and into trees whereby vines or the like may be clamped between the jaw sets and then removed by pulling on the handle 10, as set forth hereinabove.

From the foregoing, it will be seen that I have devised an improved apparatus for pulling plants, such as weeds, vines and the like. By providing apparatus having a pair of jaw sets one of which may be driven hoe-like into the ground and then, by pulling on the handle in a conventional manner, the jaw sets are brought into clamping engagement with the plant, the plant may be removed by a smooth, continuous movement of the apparatus through the soil and without having to manipulate auxiliary clamping apparatus in addition to pulling on the handle. Also, by providing spaced apart tines which cooperate with each other to provide a substantially continuous surface while the tines are in clamping engagement with each other, I assure a firm grip with the plant and prevent small weeds, vines and the like from passing between the jaw sets. Furthermore, by providing a tool which includes a digging fork or hoe-like element as well as clamping elements adapted to remove a plant, I greatly simplify the construction of the tool and the operation thereof.

While I have shown my invention in but one form, it will be obvious to those skilled in the art that it is not so limited, but is susceptible of various other changes and modifications without departing from the spirit thereof.

I claim:
1. In a plant puller,
 (a) an elongated handle,
 (b) a sleeve slidably mounted on the handle intermediate the ends of said handle and in spaced relation to the upper end thereof,
 (c) a depending link pivotally connected at its upper end to the lower end of said handle,
 (d) a first downwardly and forwardly extending jaw set rigidly mounted on the lower end of said link,
 (e) a rigid extension bar operatively connected at its upper end to said sleeve and extending downwardly alongside said handle across said depending link and pivotally connected to said link where the two cross, and
 (f) a second downwardly and forwardly extending jaw set carried by the lower end of said extension bar rearwardly of said first jaw set and adapted to cooperate with the rear side of said first jaw set to grip a plant therebetween, all of the foregoing permitting the second jaw set to be driven hoe-like into the ground, whereupon the jaw sets may be brought together in plant gripping relation by pulling upwardly on said handle.

2. Apparatus as defined in claim 1 in which the jaw sets each embody separate tines, the tines being relatively transversely spaced so that when brought together the tines of each set substantially close the spaces between the tines of the other set.

3. Apparatus as defined in claim 2 in which the tines of both jaw sets are concavely curved as viewed from the front side thereof facing the upper end of said handle.

4. Apparatus as defined in claim 1 in which a stop is carried by the extension bar in position to engage said link upon movement thereof to full open position of the jaw sets, thereby to limit opening movement of said jaw sets.

5. Apparatus as defined in claim 1 in which the upper end of the extension bar is pivotally connected to the lower end of the sleeve and a hand grip is provided adjacent the upper end of said extension bar.

References Cited
UNITED STATES PATENTS

| | | | |
|---|---|---|---|
| 351,893 | 1/1866 | Eaton | 56—400.9 |
| 3,225,838 | 12/1965 | Gotzinger | 172—378 |
| 3,264,809 | 8/1966 | Jackson | 56—400.12 |

ROBERT E. BAGWILL, Primary Examiner

STEPHEN C. PELLEGRINO, Assistant Examiner

U.S. Cl. X.R.

56—241, 400.4; 294—50.9